UNITED STATES PATENT OFFICE.

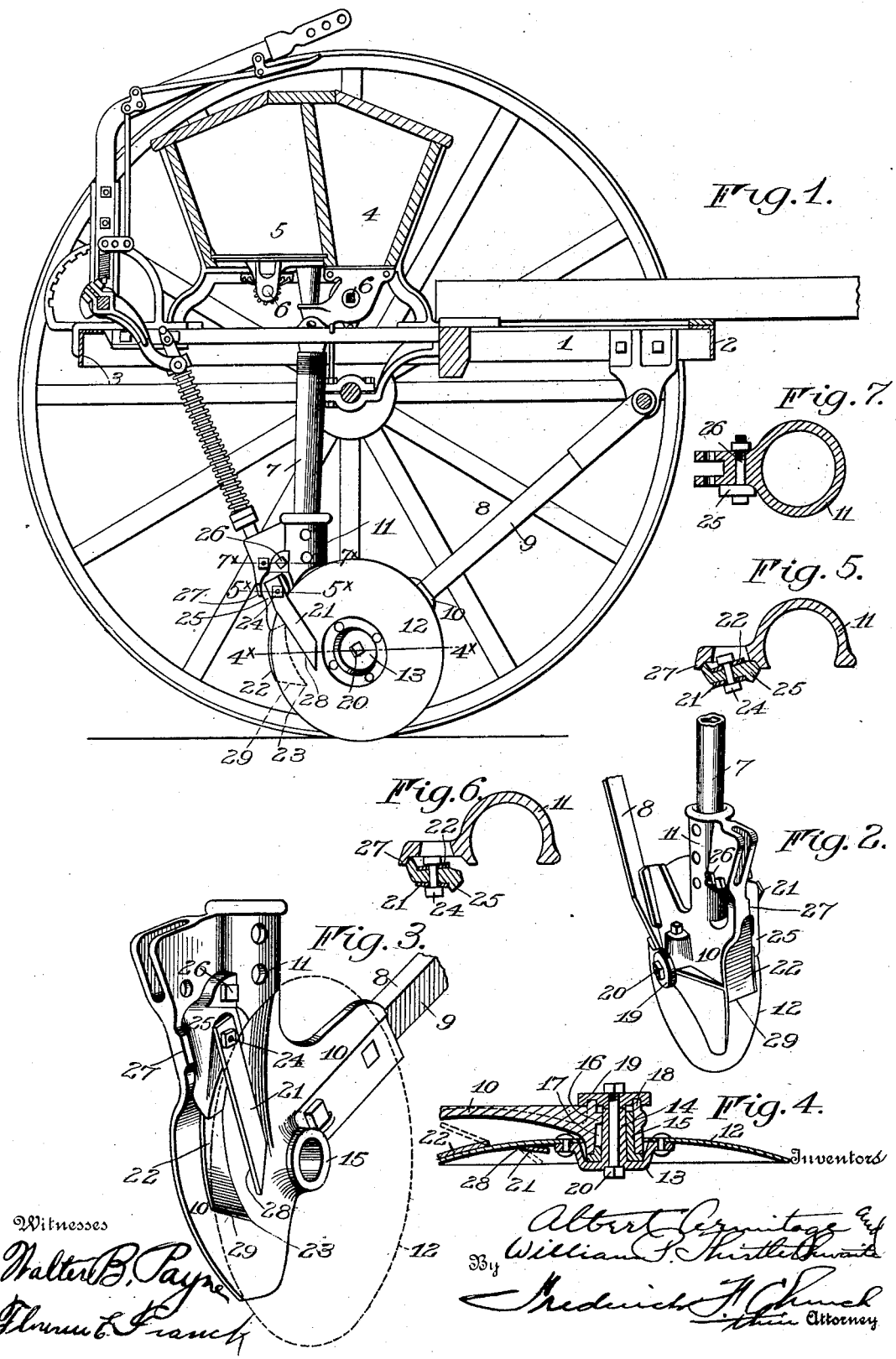

ALBERT ARMITAGE, OF FAIRPORT, AND WILLIAM P. THISTLETHWAITE, OF MACEDON, NEW YORK, ASSIGNORS TO ONTARIO DRILL COMPANY, OF DESPATCH, NEW YORK, A CORPORATION OF NEW YORK.

DISK DRILL.

No. 879,831.          Specification of Letters Patent.          Patented Feb. 18, 1908.

Original application filed April 24, 1905, Serial No. 257,053. Divided and this application filed April 21, 1906. Serial No. 312,958.

*To all whom it may concern:*

Be it known that we, ALBERT ARMITAGE, of Fairport, in the county of Monroe, and WILLIAM P. THISTLETHWAITE, of Macedon, in the county of Wayne, both in the State of New York, have invented certain new and useful Improvements in Disk Drills; and we do hereby declare the following to be a full, clear, and exact description of the same, reference being had to the accompanying drawings, forming a part of this specification, and to the reference numerals marked thereon.

Our present invention relates to grain drills and particularly to that class known as disk drills and it has for its object to provide a new and improved form of tool therefor comprising generally a rotary member or disk and scraping devices coöperating therewith to remove dirt or other material adhering thereto which yieldingly engage the disk.

To these and other ends the invention consists in certain improvements and combinations of parts all as will be hereinafter more fully explained, the novel features being pointed out in the claims at the end of the specification.

In the drawings: Figure 1 is a detail longitudinal sectional view of a grain drill illustrating devices embodying our invention as applied thereto. Fig. 2 is a rear perspective view of a tool. Fig. 3 is a similar detail view of the shoe and scraping devices with the disk removed. Fig. 4 is a detail sectional view taken on the line $4^\times$—$4^\times$ of Fig. 1. Fig. 5 is a similar view on the line $5^\times$—$5^\times$ of Fig. 1. Fig. 6 is a view similar to Fig. 5 illustrating the position of the scraping devices before they are secured to the shoe. Fig. 7 is a detail view on the line $7^\times$—$7^\times$ of Fig. 1.

Similar reference numerals in the several figures indicate similar parts.

The present application is a division of our prior application for patent for improvements in grain drills, filed April 24th, 1905, Serial No. 257,053, and the parts described herein are shown as applied to grain drills of the usual construction consisting generally of a rectangular frame composed of side pieces 1 and front and rear pieces 2 and 3 respectively, on which is supported the seed and fertilizer hoppers 4 and 5 from which the material is distributed by suitable feeding mechanism 6 and conveyed by the conductor 7 to the rear of the tools.

Each tool is attached to the grain drill by a draw bar 8 composed preferably of angle iron and arranged with one of its faces or sides as indicated by 9, in a vertical plane to which is secured a shoe or support 10 forming part of the tool, provided with a boot leg 11, receiving the end of the conductor 7, said tool embodying a dish-shaped disk 12 perforated at its center and having upon its inner side an outwardly-projecting recessed center piece 13 provided with a tapering projecting journal 14. The latter fits into a chilled or hardened bearing 15 which is removably secured in a laterally-extending hub on the shoe 10 and is prevented from rotation therein by a lug 16 engaging a slot 17 provided at one side of the bearing. Embracing the end 18 of the hub is a washer 19 through which the locking bolt 20 extends, its head and nut respectively engaging the faces of the center piece and washer. This arrangement of the parts, it will be seen, provides a bearing which is in alinement with the disk instead of at one side thereof, thereby greatly reducing the wear of the parts and obviating the normal tendency of the disk to cramp or bind in its bearing. Inasmuch as the disks are not formed perfectly and variations occur in the curve of their surfaces and they also wabble on their bearings, it is necessary that the scraping device employed in connection therewith, be mounted in such a manner that its operation will not be affected by either the imperfections in construction, or the irregularities of movement of the disk. In the present instance the scraping device is mounted on the face of the flange of the shoe which extends rearwardly from the boot 11 and above the rear edge of the disk and comprises two yielding blades 21 and 22, the former extending downwardly and forwardly over the inner or concave face of the disk while the latter extends downwardly over the outer convex face and is provided with a downwardly and forwardly-projecting point 23. The blades are mounted on opposite sides of a block 25 provided with shoulders or ribs (as shown) for accurately positioning them, against which they are held by a bolt 24, which also secures them to the block. The blades are set at such an angle relatively to each other that when removed from the disk the lower end of the blade 22 projects laterally beyond the blade 21 so that when they are placed in position straddling the disk the blade 21 and the lower end of the blade 22 will assume the position shown in dotted lines in Fig. 4. In practice this normal tendency of the blades to overlap may be produced by making the face against which the blade 21 is clamped at a slight angle to the corresponding face on which the blade 22 is mounted. In applying the scraping device to the disk the rear edge of the block 25 is placed in front of and in engagement with the lug 27 on the face of the support, and in this position it will extend outwardly at an angle thereto, as shown in Fig. 6, to position the scrapers, as shown in dotted lines in Fig. 4. The tightening of the bolt 26 rotates the forward edge of the block into engagement with the face of the support, and secures it thereon in the position shown in Fig. 5. The rotary movement of the block on the lug 27 as a fulcrum, causes the upper ends of the scraping blades to be twisted, placing them under torsional tension to flatten their scraping edges down against the disk, as shown in full lines in Fig. 4. This spring tension causes the edge 28 of the blade 21 and the edge 29 of the blade 22 to tightly hug the opposite sides of the disk allowing them to yield sufficiently to follow irregularities in the disk itself and also to conform thereto if the disk rotates on an irregular or worn bearing.

Tools constructed in accordance with our invention require little machining and may be cheaply manufactured and assembled while the parts operate freely at all times, notwithstanding the roughness of the work, with a minimum of wear.

We claim as our invention:

1. In an agricultural tool, the combination with a support and a disk revolubly mounted thereon, of a block detachably connected to the support and spring fingers rigidly connected to the block and yieldingly engaging opposite sides of the disk.

2. In an agricultural tool, the combination with a support and a disk revolubly mounted thereon, of a block, spring fingers thereon engaging opposite sides of the disk and means for connecting the block to the support to rotate it thereon to place said fingers under tension.

3. In an agricultural tool, the combination with a support and a disk revolubly mounted thereon, of a block, spring fingers arranged thereon with the working edge of one normally extending laterally toward the corresponding edge of the other, said fingers being adapted to engage opposite sides of the disk and means for securing the block to the support.

4. In an agricultural implement, the combination with a disk, a support on which the latter is journaled, a block having inner and outer faces, of scraper fingers adapted to engage opposite sides of the disk, each having an end resting against one of said faces on the block, a single attaching device securing the blades to the block and a clamping member attaching the latter to the support.

5. In an agricultural tool, the combination with a support and a revoluble disk mounted thereon, of a block, scraper fingers thereon adapted to yieldingly engage opposite sides of the disk and disposed relatively to each other on the block so that when the latter is in the normal position spring tension is imparted to the fingers and a securing device for clamping the block to the support.

6. In an agricultural tool, the combination with a disk, a support on which the latter is journaled having a face arranged above the disk at one side thereof and provided with a lug, of a block coöperating with the lug, two scraper fingers secured to opposite sides of the block and adapted to coöperate with opposite sides of the disk and a bolt detachably securing the block to the face.

ALBERT ARMITAGE.
WILLIAM P. THISTLETHWAITE.

Witnesses:
J. L. THISTLETHWAITE,
E. D. LAPHAM.